(12) United States Patent
Debleser

(10) Patent No.: US 6,488,486 B1
(45) Date of Patent: Dec. 3, 2002

(54) INDIRECT COOLING OF AN ELECTRIC FAN

(75) Inventor: Yves Debleser, Enghien (BE)

(73) Assignee: Jeumont Industrie, Courbevoie (FR)

( * ) Notice: Subject to any disclaimer, the term of this patent is extended or adjusted under 35 U.S.C. 154(b) by 0 days.

(21) Appl. No.: 09/763,514

(22) PCT Filed: May 30, 2000

(86) PCT No.: PCT/FR00/01495
§ 371 (c)(1),
(2), (4) Date: Feb. 23, 2001

(87) PCT Pub. No.: WO01/00995
PCT Pub. Date: Jan. 4, 2001

(30) Foreign Application Priority Data

Jun. 24, 1999 (FR) .............................. 99 08097

(51) Int. Cl.⁷ .......................... F04B 17/00; F04B 35/04
(52) U.S. Cl. ................... 417/423.8; 417/423.7; 417/366; 310/52
(58) Field of Search ............... 417/423.8, 366, 417/367, 368, 369, 371, 372, 423.7, 370; 310/52, 58, 62

(56) References Cited

U.S. PATENT DOCUMENTS

| | | | |
|---|---|---|---|
| 3,712,760 A | | 1/1973 | Furlong et al. |
| 4,554,472 A | * | 11/1985 | Kumatani ................ 310/62 |
| 4,574,210 A | * | 3/1986 | Wieland ................ 310/59 |
| 4,883,982 A | * | 11/1989 | Forbes et al. ............ 310/62 |
| 4,908,538 A | * | 3/1990 | Geberth, Jr. ............. 310/59 |
| 5,217,353 A | * | 6/1993 | De Filippis ............ 417/368 |
| 5,350,281 A | * | 9/1994 | Hagshenas ............. 417/371 |
| 5,818,133 A | * | 10/1998 | Kershaw et al. ......... 310/67 R |
| 5,944,497 A | * | 8/1999 | Kershaw et al. ......... 417/423.8 |
| 6,050,786 A | * | 4/2000 | Lin ...................... 417/366 |

FOREIGN PATENT DOCUMENTS

| | | |
|---|---|---|
| EP | 0 823 554 | 2/1998 |
| FR | 1266625 | 6/1961 |

* cited by examiner

*Primary Examiner*—Charles G. Freay
*Assistant Examiner*—Han L. Liu
(74) *Attorney, Agent, or Firm*—Connolly Bove Lodge & Hutz LLP

(57) ABSTRACT

The mobile part of a fan includes at least one rotor of an electric motor and fan blades integral with the rotor. A rotating fixed part includes at least one stator of the electric motor. The fan additionally includes at least part of the electric motor that includes the stator arranged in an enclosed chamber. The motor-operated fan includes structure for guiding a first fluid passing through at least one of the mobile part and fixed part of the motor-operated fan between a fist zone with a first pressure of the first fluid outside the enclosed chamber on a first side of the blades of the motor-operated fan in an axial direction, and a second zone with a second pressure on a second side of the blades of the motor-operated fin outside the enclosed chamber, the second pressure being less than the first pressure. A second fluid contained in the enclosed chamber is circulated, in thermal contact with the guiding means for the first fluid, in such a way as to cool at least a part of the electric motor by circulation of the first and of the second fluids.

11 Claims, 5 Drawing Sheets

INDIRECT COOLING OF AN ELECTRIC FAN

FIELD OF THE INVENTION

The invention relates to a motor-operated fan for circulating a fluid in a heat-exchange plant-and to a process for cooling the motor for driving the motor-operated fan.

BACKGROUND OF THE INVENTION

In heat exchange plants of large dimensions, in which very large quantities of heat are transferred, it may be necessary to use a motor-operated fan to circulate one of the exchange fluids.

In particular, in the plants for cooling the condenser associated with the turbine of a nuclear reactor, it is becoming common to use, as a replacement for the very tall cooling towers using natural circulation of air, shorter cooling towers in which are disposed refrigerating installations making it possible to cool the water of the condenser by circulation of atmospheric air. It is thus possible to use shorter towers which blend more easily into the landscape of the site of the nuclear power station.

In the case of cooling towers using natural circulation of air, a current of atmospheric air is produced by natural draft inside the tower and the water to be cooled is circulated, generally in a counter-current relative to the cooling air, in a divided form making it possible to assist the thermal contact. The cooling of the water is achieved mainly by evaporating a part of this water inside the cooling tower.

In certain cooling towers, cross-current circulation is employed, instead of counter-current circulation of water and of cooling air.

In the case of shorter cooling towers comprising refrigerating installations, these refrigerating installations each comprise a fan for circulating cooling air. For example, in the case of a nuclear power station rated at 1300 MWe, an assembly of eighteen refrigerating installations is used, comprising eighteen fans for circulating cooling air.

The fans may be arranged downstream of the zone of heat exchange between the cooling air and the water; the draft is then said to be "induced".

The fans can also be arranged -upstream of the heat exchange zone; one then speaks of a "forced" draft.

Fans having, mechanical draft of cooling air must be driven by an electric motor which may be of the indirect drive or direct drive type. In the case of an indirect-drive fan, the revolving part of the fan comprising the blades for churning the air is driven by way of a gear train.

In the case of a direct-drive fan or motor-operated fan, the churning blades are directly integral with the rotor of the electric motor.

One type of electric motor which is particularly well suited to the case of a direct-drive fan is the disk-type motor whose rotor generally comprises permanent magnets fixed on one or more disks, cooperating with the coils of the stator.

The electric motors for driving motor-operated fans with high power ratings must be cooled during their operation.

The use of an auxiliary cooling device increases the installation and operating costs of the motor-operated fans and makes their design and use more complex.

Cooling the electric motor for driving a fan using cooling air circulated by the fan has the drawback of bringing into contact with the electrical parts of the motor, and in particular with the windings of the stator, a fluid which exhibits a certain amount of humidity and which may contain polluting substances.

BRIEF DESCRIPTION OF THE INVENTION

The aim of the invention is therefore to propose a motor-operated fan for circulating a fluid in a heat exchange plant of large dimensions comprising a mobile part rotating about an axis of the motor-operated fan comprising at least one rotor of an electric motor for driving the motor-operated fan and fan blades integral with the rotor, and a rotating fixed part comprising at least one stator of the electric motor, it being possible to cool this motor-operated fan without using an auxiliary element and an external source of power.

With this aim:

a part at least of the electric motor comprising the stator is arranged in an enclosed chamber, and the motor-operated fan comprises means for guiding a first fluid passing through one at least of the mobile part and fixed part of the motor-operated fan between a first zone with a first pressure of the first fluid outside the enclosed chamber on a first side of the blades of the motor-operated fan in the axial direction, and a second zone with a second pressure on a second side of the blades of the motor-operated fan outside the enclosed chamber, the second pressure being less than the first pressure and means for circulating a second fluid contained in the enclosed chamber, in thermal contact with the means for guiding the first fluid, in such a way as to cool at least a part of the electric motor of the motor-operated fan by circulation of the first and of the second fluids.

The invention also relates to the process for cooling the motor-operated fan.

To provide a proper understanding of the invention, a motor-operated fan according to the invention having direct drive comprising a disk-type motor will be described by way of example whilst referring to the appended figures.

Figure 1:
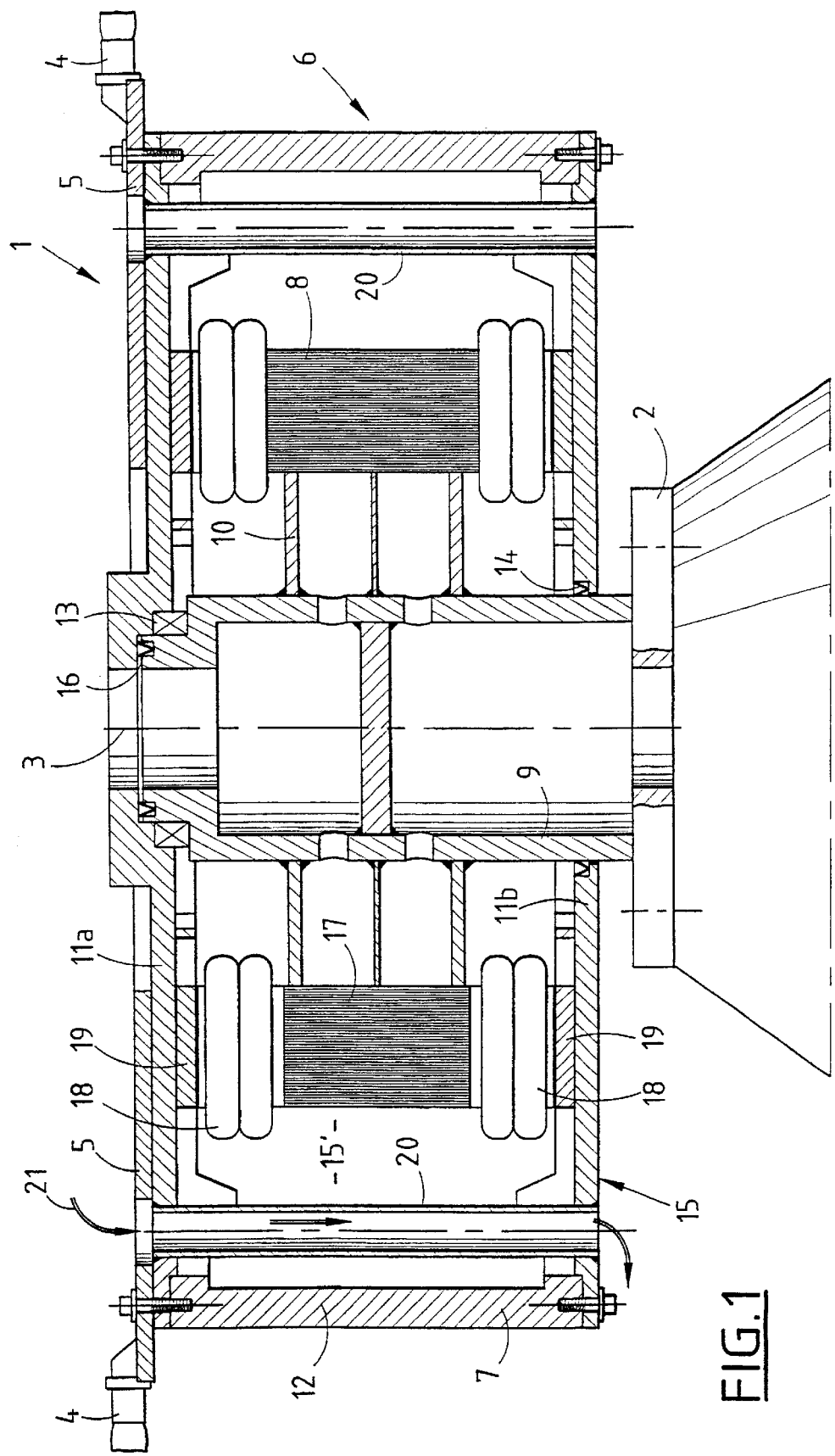
FIG. 1 is a view in elevation and in axial section of a motor-operated fan according to the invention comprising a disk-type motor and means for cooling the disk-type motor.

Represented in FIG. 1 is the motor-operated fan according to the invention, designated in a general manner by the label 1.

The motor-operated fan 1 can be used to circulate cooling air in a tower for cooling the water of a condenser of a nuclear power station.

The motor-operated fan 1 comprises a fixed part integral with a support 2 which can be fixed on a part of the civil engineering of the cooling tower and a mobile part rotating about the vertical axis 3 of the motor-operated fan, with respect to the fixed part. The mobile part of the fan comprises air churning blades 4 of the fan which are integral with a blade-carrier mounting 5.

DETAILED DESCRIPTION OF THE INVENTION

The blade-carrier mounting Sand the blades 4 are driven in rotation about the axis 3 of the motor-operated fan by an electric motor 6 which can advantageously be a disk-type motor. The motor 6 comprises a rotor 7 and a stator 8.

The blade-carrier mounting 5 is integral with the rotor 7 of the electric motor 6 on which it is fixed, for example by way of screws.

The fixed part of the motor-operated fan comprises a vertical shaft 9 integral with the fixed support 2 of the motor-operated fan. The stator 8 of the electric motor 6 is fixed on the shaft 9, by way of a central support 10 which can consist for example of annular members carrying the casing elements of the stator 8 at their peripheral part.

The rotor 7 of the electric motor 6 comprises a casing of cylindrical overall shape consisting of an upper annular disk 11a, of a lower annular disk 11b and of a bush 12 to which the disks 11a and 11b are fixed at their periphery.

The casing of the rotor is mounted rotatably on the shaft 9 of the fan, by way of a ball thrust bearing 13 and of a rubbing flexible seal 14.

The casing of the rotor 7 and the shaft 9 which between them delimit an annular compartment 15' constitute an enclosed chamber 15 which is virtually leaktight to air by virtue of the flexible seal 14 and of a second leaktight seal 16 interposed between a part of the upper disk 11a of the casing of the rotor and an end part of the shaft 9.

The stator 8 which comprises casing elements of laminated magnetic sheeting 17 of annular shape and electric coils 18 wound in notches of the laminated casing is arranged inside the enclosed chamber 15 constituting a virtually leaktight enclosed chamber.

The rotor comprises permanent magnets 19 fixed on the inner faces of the disks 11a and 11b opposite the coils 18 of the stator.

The coils 18 of the stator are supplied with electric current by conductors passing inside the shaft 9 which is made in hollow form and which comprises, at its ends, respectively, an entrance aperture and an exit aperture emerging on either side of the blades 4 of the fan The energizing of the coils 18 produces a rotating magnetic field which drives the rotor by way of the permanent magnets 19.

The motor 6 which comprises a rotor having disk-shaped elements 11a and 11b is said to be of the "disk" type. When the rotating part of the motor-operated fan comprising the rotor 7, the blade-carrier disk 5 and the blades 4 are set into rotation, the rotation of the blades causes a circulation of external air in a globally axial direction, that is to say parallel to the axis 3 of the motor-operated fan.

Moreover, inside the device in which the motor-operated fan 1 is placed, for example inside the cooling tower, a static pressure difference is set up between the zone situated upstream and the zone situated downstream of the blades 4, in the axial direction 3 of circulation of the cooling air.

According to the invention, this static pressure difference is used to circulate cooling air, for example inside heat exchange tubes 20 passing in an axial direction through the casing of the rotor of the fan, and emerging at a first end into the zone situated upstream of the blades 4 of the fan, and at a second end into the zone situated downstream of the blades 4, in such a way that cooling air or external air circulates in the direction indicated by the arrows 21. In the case of a motor-operated fan used to produce an induced draft in a cooling tower, the circulation of external air, in the axial direction, occurs from top to bottom, toward the zone of exchange with the cooling water.

The heat exchange tubes 20 comprise, as will be explained hereinbelow, on their outside surface, heat exchange elements, such as fins making it possible to ensure the cooling of the air referred to as "internal air" contained in the compartment 15 enclosing the stator 8.

Figure 2:
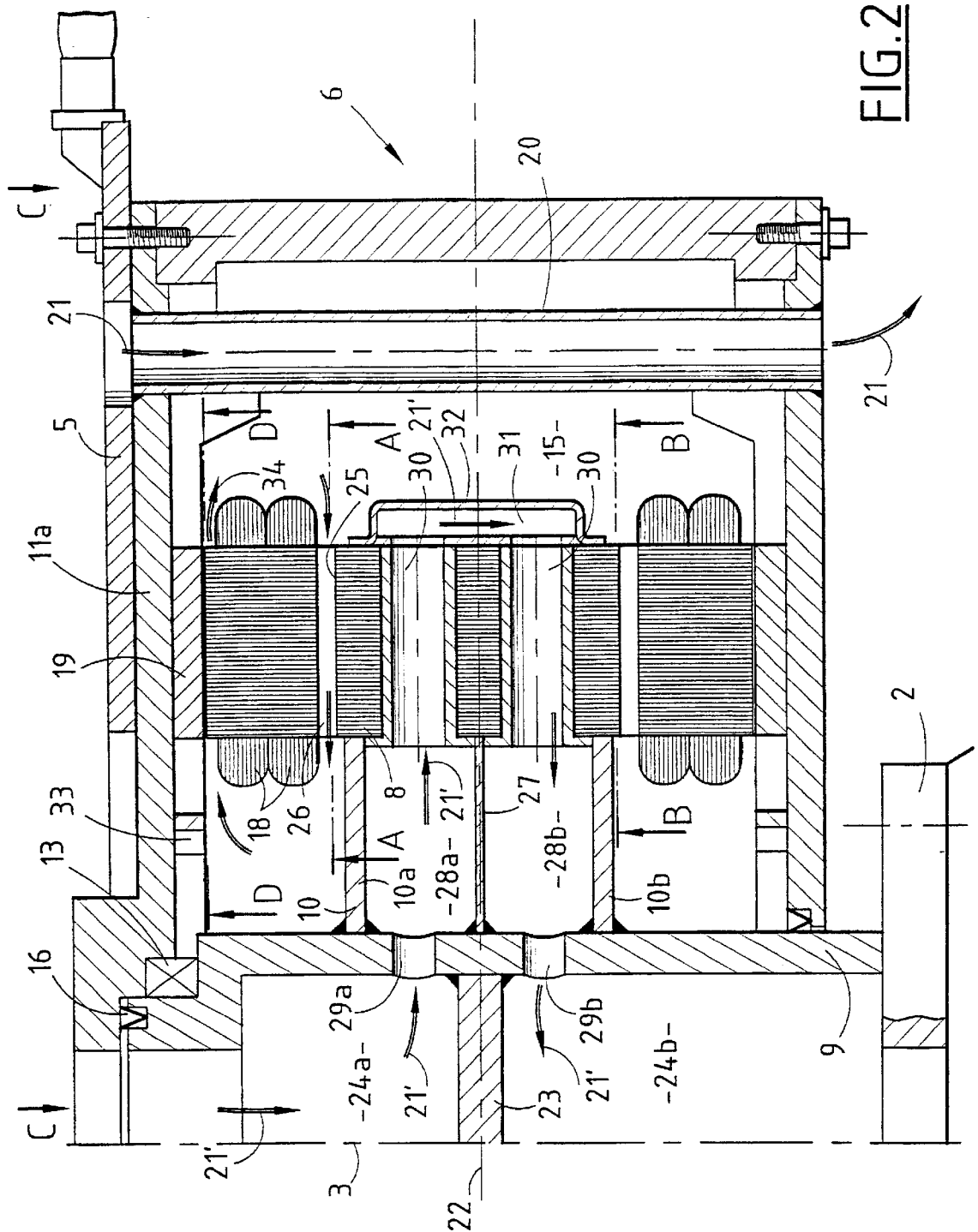
FIG. 2 is a half-view in axial section of the means for cooling the electric motor.
Figure 2A:
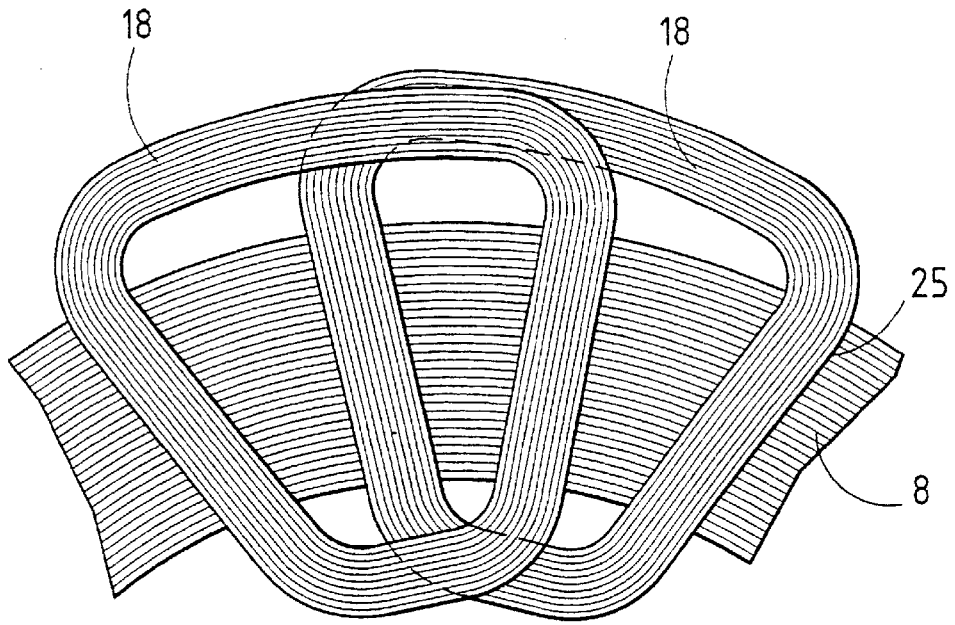
FIG. 2A is a view along A—A of FIG. 2.

Reference will now be made to FIG. 2 as well as to FIGS. 2A, 2B, 2C and 2D to describe in greater detail the electric motor 6 and the motor cooling means.

The motor 6 as a whole is symmetric with respect to a plane 22 perpendicular to the axis 3 of the motor-operated fan and of the motor 6, the trace of which has been represented in FIG. 2.

A partition 23 arranged along the plane of symmetry 22 and fixed along a cross section of the internal space of the hollow shaft 9 separates this internal space into an upper entrance zone 24a and a lower exit zone 24b.

The support 10 of the stator 8 consists of an upper annular plate 10a and a lower annular plate 10b which are welded to the external surface of the hollow shaft 9, on either side of the plane 22.

The upper part of the casing of the stator 8 is fixed to the peripheral part of the upper annular plate 10a while the lower part of the casing of the stator is fixed on the lower annular plate 10b In its upper part and in its lower part, the casing of the stator 8 of annular shape (see FIG. 2A) comprises notches 25 of radial direction which are intended to receive the turns of the coils 18 of the stator.

As is visible in FIG. 2, there is, between the turn of each coil arranged toward the inside of the casing and the bottom of the notch 25, a free space 26 which puts into communication the two parts of the compartment 15' which are situated on either side of the stator 8 in the radial direction.

A transverse annular partition 27 perpendicular to the axis 3 of the motor-operated fan and on which is fixed a central part of the casing of the stator 8 separates the interior part of the space 15, between the upper and lower transverse annular partitions 10a and 10b, into an upper manifold 28a and a lower manifold 28b.

The upper manifold 28a communicates with the upper zone 24a of the internal space of the hollow shaft 9 via at least one passage 29a passing through the wall of the hollow shaft 9. Likewise, the lower manifold 28b communicates with the lower zone 24b of the internal space of the hollow shaft 9 via at least one passage 29b passing through the wall of the hollow shaft 9.

Figure 2B:
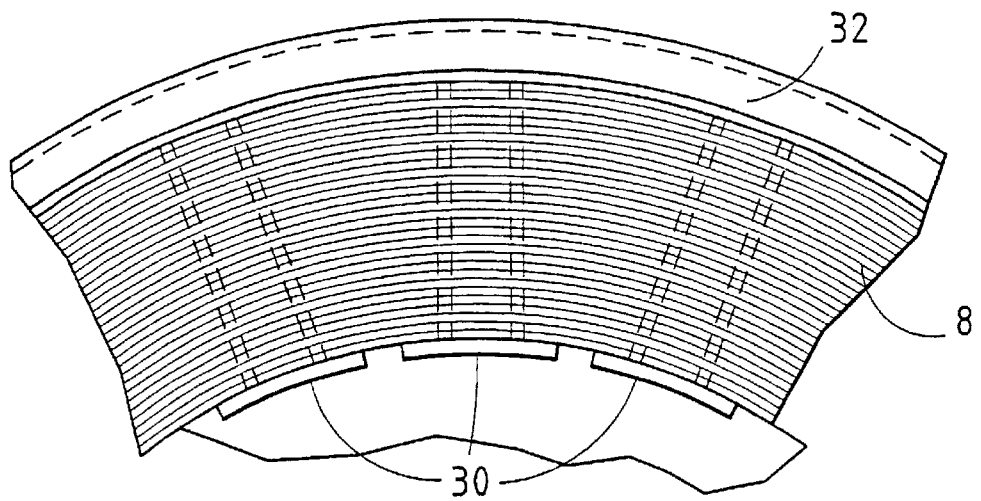
FIG. 2B is a view along B—B of FIG. 2.

As is visible in FIGS. 2 and 2B, tubes 30 for the passage of gas are fixed in apertures of radial direction passing through the casing of the stator 8 so as to emerge at one of their ends into a manifold 28a or 28b and, at their other end, outside the casing of the stator 8, into a distribution manifold 31 delimited by a hood 32 of annular shape fixed on the outside surface of the casing of the stator 8.

The tubes 30 can be fixed in the radial apertures passing through the casing of the stator by flanging.

It is possible to use-any number of tubes 30 distributed at constant angular distances along the periphery of the stator, to distribute cooling fluid between the manifolds 28a and 28b.

The annular manifolds 28a and 28b respectively constitute entrance and exit manifolds and the external annular manifold 31, a manifold for distributing fluid for cooling the motor consisting of the external air.

Figure 2C:
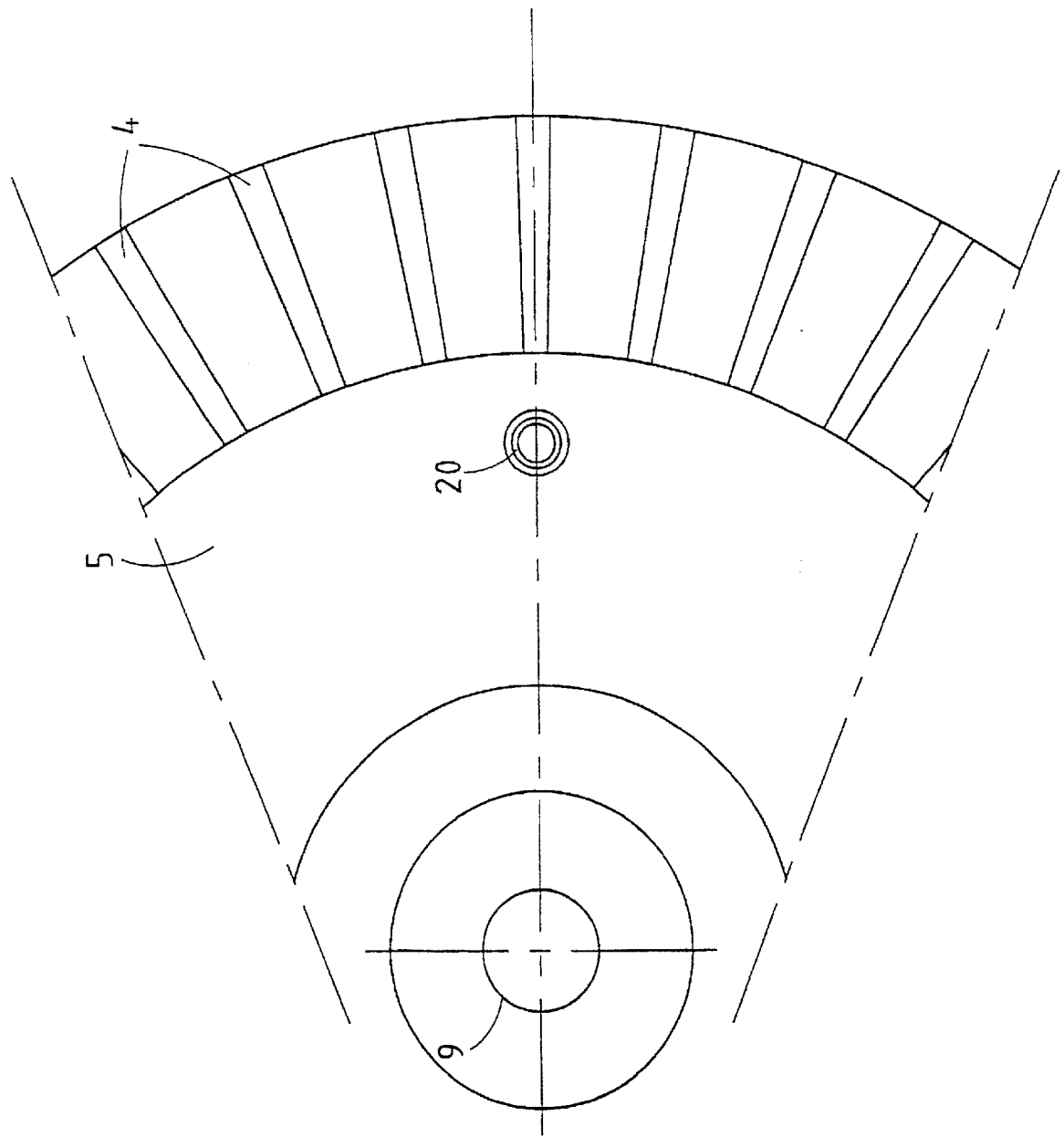
FIG. 2C is a view along C—C of FIG. 2.
Figure 2D:
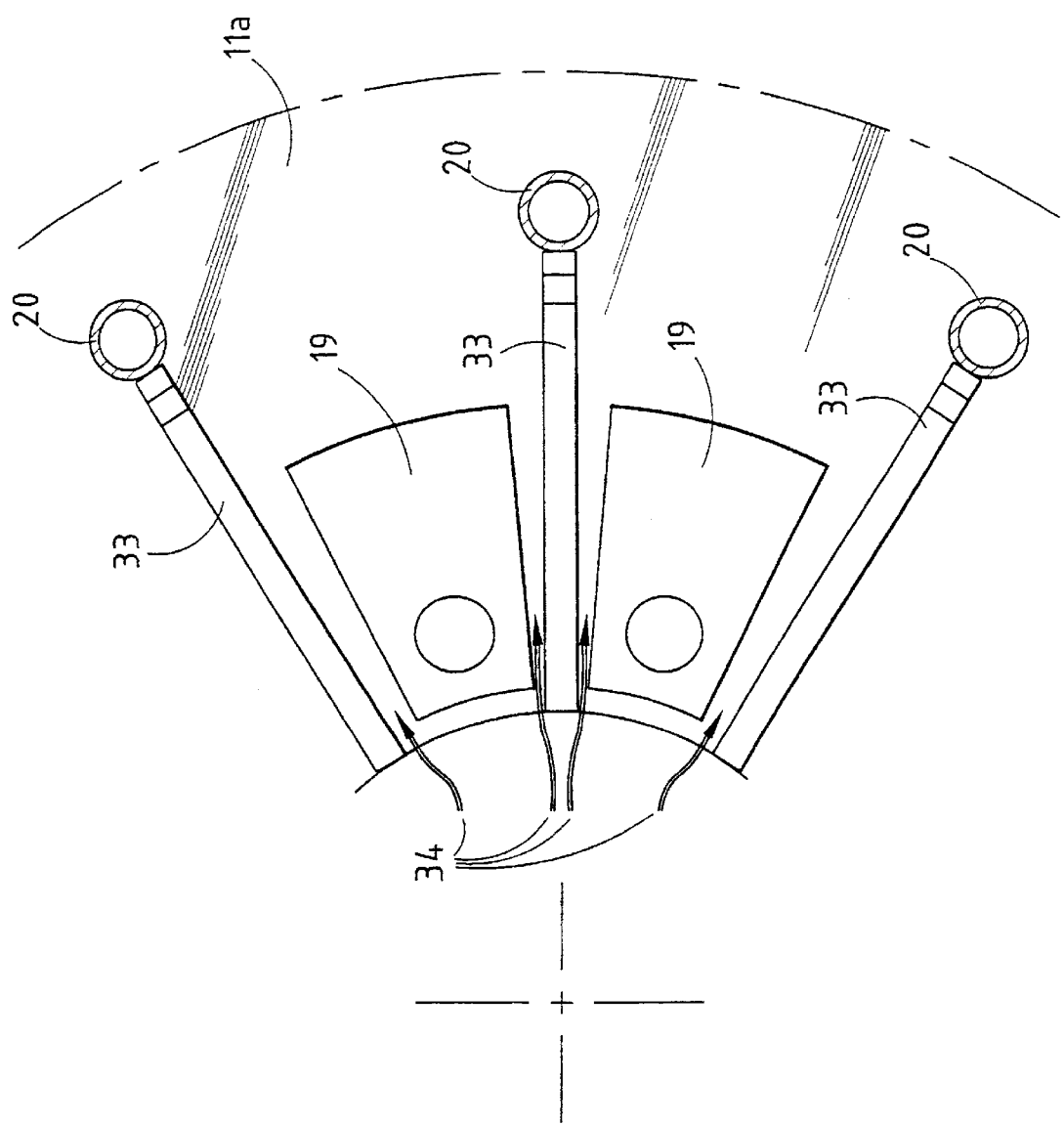
FIG. 2D is a view along D—D of FIG. 2.

As is visible in FIGS. 2 and 2D, the upper annular plate 11a and the lower annular plate 11b of the casing of the rotor 7 of the electric motor carry, between the magnets 19 placed successively along the circumferential direction of the rotor, partitions 33 of radial direction projecting on the internal face of the annular wall 11a or 11b and running radially over the entire width of the annular plate 11a or 11b between the tubes 20 for circulating external air and the inside edge of the annular plate 11a or 11b.

During the rotation of the rotor, the partitions 33 constitute blades for churning and circulating the internal air contained in the enclosed chamber 15, this air being separated from the external air by the partitions and the joints closing the chamber 15.

As indicated earlier, the outside surface of the tubes 20 carries exchange fins which may preferably be of substantially longitudinal or axial direction so as to ensure, in addition to an increase in the exchange area, agitation and circulation of the internal air contained in the compartment 15.

Likewise, the hood 32 can carry exchange fins which circulate the internal air contained in the chamber 15.

As is visible in FIG. 2, the tubes 20 of axial arrangement which are distributed along the periphery of the casing of the rotor 7 are fixed at their ends, at the level of through apertures, into the upper annular plate 11a and into the lower annular plate 11b of the-casing of the rotor 7.

Due to the static pressure difference between the zone situated upstream and the zone situated downstream of the blades and of the blade-carrier disk 5 of the fan, external cooling air is made to circulate inside the tubes 20, as represented by the arrows 21.

Due to the difference in pressure on either side of the fan, and as represented by the arrows 21', external air is also made to circulate inside the zones and manifolds 24a, 28b, 31, 28b and 24b, by passing through the casing of the stator inside the tubes 30.

External cooling air is admitted via the entrance aperture of the hollow shaft 9 into the entrance zone 24a of the internal space, and is then transmitted by the aperture or apertures 29a into the entrance manifold 28a of the compartment 15', through a first tube 30 (or a first assembly of tubes) into the distribution manifold 31, through a second tube 30 into the exit manifold 28b of the compartment 15 and then, through the aperture or apertures 29b, into the exit manifold 24b, the cooling air then being discharged through the exit aperture of the hollow shaft 9 and through the support 2, into the cooling plant.

Represented in FIG. 2C is a top view of the blade support disk 5, the blades 4 and the air entrance aperture of the hollow shaft 9 and an aperture of the blade support disk 5 affording access to a tube 20.

During the rotation of the rotor 7 of the motor, the partitions 33 integral with the upper plate and with the lower plate of the casing of the rotor and projecting toward the inside of the compartment 15' ensure circulation of the internal air contained in the compartment 15', along the arrows 34 visible in FIGS. 2 and 2D.

The internal air of the chamber of the rotor is made to circulate in the radial direction in the passages disposed between the magnets 19 and the partitions 33. This circulation can be assisted by placing spacers of circumferential direction between the partitions 33 toward the inside of the casing of the rotor 7.

The internal air circulates, outside the stator 8, in contact with the tubes 20 and/or the exchange fins of the tubes 20 and with the outside surface or the exchange fins of the hood 32. The internal air is thus cooled. The circulation of the internal air is closed up by way of the circulation spaces 26 in the bottoms of notches 25, so that the circulation of the secondary air takes the form of closed circulation loops around the coils and through the casing of the stator 8. This circulation of the internal air in a closed circuit with cooling in contact with the walls of the tubes 20 and of the hood 32 allows effective cooling of the stator and of the internal surfaces of the rotor.

Furthermore, the circulation of external air through the casing of the stator, as represented by the arrows 21', also makes it possible to cool the stator effectively.

It should be noted that the external cooling air never comes into contact with the windings of the stator and with the permanent magnets of the rotor, the cooling air internal circuit being completely isolated from the part of the chamber or compartment 15 containing the functional electrical parts of the motor 6.

This avoids any corrosion and any deterioration of these electrical parts which are in contact only with perfectly dry and pollutant-free internal air.

The motor-operated fan according to the invention and the process for cooling the electric motor which have been described therefore make it possible to carry out, without using any auxiliary cooling device or auxiliary exchange fluid and any external energy source, effective cooling of the electric motor of the motor-operated fan, without any risk of corrosion or fouling of the functional electrical parts of the motor.

The invention is not limited to the embodiment which has been described.

Thus, it is possible to use any type of means making it possible to guide the external cooling air through the rotor or through the stator of the motor, in its central part neighboring its axis of rotation or in its peripheral part and any type of means linked with the rotor making it possible to ensure the circulation of internal air, in the substantially leaktight chamber of the electric motor.

The invention applies to the case of fans driven by disk-type motors exhibiting a form and a structure which differ from those which have been described for example in the case of any disk-type motors whose rotor comprises one or more disks on which permanent magnets or coils are fixed. The cooling process according to the invention can also be used in the case of motor-operated fans equipped with motors other than disk-type motors.

The invention applies in the case of a motor-operated fan comprising a motor having any number of rotors and/or stators.

Finally, the invention applies not only in the case of motor-operated fans used in towers for cooling the water of the condenser of a nuclear power station but also in the case of motor-operated fans ensuring the circulation of an exchange fluid in a thermal plant of large dimensions used in any industrial sector.

What is claimed is:

1. A motor-operated fan for circulating a fluid in a heat exchange plant of large dimensions, the fan including a mobile part rotating about m axis of the motor-operated fan, the mobile part including at least one rotor of an electric moor driving the motor-operated fan and fan blades integral with the rotor, and a rotating fixed part comprising at least one stator of the electric motor, the fan comprising:

a part at least of the electric motor that includes the stator is arranged in an enclosed chamber, and the motor-operated fan comprises means for guiding a first fluid passing through one at least of the mobile part and fixed part of the motor-operated fan between a first zone with a first pressure of the first fluid outside the enclosed chamber on a first side of the blades of the motor-operated fan in the al direction, and a second zone with a second pressure on a second side of the blades of the motor-operated fan outside the enclosed chamber, the second pressure being less than the fist pressure and means for circulating a second fluid contained in the enclosed chamber, in thermal contact with the guiding means for the first fluid, in such a way as to cool at least a part of the electric motor by circulation of the first and of the second fluids.

2. The motor-operated fan as claimed in claim 1, wherein the enclosed chamber is delimited by a casing of the rotor of the electric motor delimiting a substantially leaktight compartment in which the stator of the electric motor is arranged.

3. The motor-operated fan as claimed in claim 2, wherein the means for guiding the f exchange fluid consist of at least one tube passing through the casing of the rotor of the electric motor in a substantially axial direction and emerging, at one end thereof, into the first zone with the first pressure and, at a second end thereof into the second zone with the second pressure, outside the leaktight chamber.

4. The motor-operated fan as claimed in claim 2, wherein the casing of the rotor of the electric motor is mounted rotatably on a hollow central shaft and that the means for guiding the first fluid comprise an entrance zone and an exit zone for the first fluid communicating, respectively, with an entrance aperture and with exit aperture of the hollow shaft emerging, respectively into the first zone with the first pressure and into the second zone with the second pressure outside the enclosed chamber and means for guiding the first fluid between the entrance zone and the exit zone of the hollow shaft, inside the enclosed chamber delimited by the casing of the rotor of the motor and the hollow shaft, through a casing of the stator of the electric motor, in such a way that the first fluid cannot come into contact with electrical parts of the stator and of the rotor of the electric motor during its circulation through the stator, in the enclosed chamber.

5. The motor-operated fan as claimed in claim 4, wherein the means for guiding the first fluid comprise at least two the passing through the casing Of the stator of annular shape, in a radial direction and a hood fixed on an external part of the casing of the stator delimiting a distribution manifold into which external end parts of the tubes emerge.

6. The motor-operated fan as claimed in claim 2 wherein the means for circulating the second fluid contained in the enclosed chamber inside the casing of the rotor of the electric motor includes partitions of substantially radial direction which are integral with at least one disk-shaped wall of the casing of the rotor of the electric motor, projecting toward the inside of the enclosed chamber delimited by the casing of the rotor of the electric motor.

7. The motor-operated fain as claimed in claim 6, wherein at least one disk-shaped wall of the casing of the rotor of the electric motor cares a plurality of permanent magnets intended to cooperate with coils of the stator arranged in the enclosed chamber and that the partitions of radial direction are each arranged between two permanent magnets arranged in succession along the circumferential direction of the rotor.

8. The motor-operated fan as claimed in claim 1, wherein the guiding means for the first fluid comprise, at least one surface in thermal contact with the second fluid inside the leaktight chamber, the at least one surface carrying heat exchange fins.

9. The motor-operated fan as claimed in claim 1, wherein die means for guiding the circulation of the second fluid in the enclosed chamber comprise a space arranged in the bottom of each notch of a casing of the stator allowing the accommodating of a turn of a winding of the stator of the electric motor.

10. A process for cooling functional electrical components of an electric motor for the rotational driving of a motor-operated fan for circulating a first fluid in a heat exchange plant of large dimensions, the fan having a mobile part rotating about an axis of the motor-operated fan and comprising at least one rotor of an electric motor for driving the motor-operated fan and fan blades integral with the rotor, and a rotating fixed part comprising at least one stator of the electric motor, wherein the first fluid is circulated through one at least of a revolving part and a fixed part of the motor-operated fan, between a first zone with a first pressure of the first fluid on a first side of the blades of the motor-operated fan and a second zone with a second pressure of the first fluid on a second side of the blades of the motor-operated fan in the axial direction, and in that a second fluid contained in an enclosed chamber containing the electrical components of the driving electric motor is circulated, by rotating the revolving part of the motor-operated fan, the circulation of the first fluid being completely separated from the circulation of the second fluid and ensuring cooling by thermal contact of the second fluid, through at least one heat exchange wall.

11. A process as claimed in claim 10, wherein the first fluid is air for cooling the water of a condenser of a nuclear power station in a heat exchange plant of large dimensions such as a cooling tower, and that the second fluid, or internal air, is air contained in the enclosed chamber containing the functional electrical components of the electric motor for driving the motor-operated fan.

* * * * *